June 12, 1951
D. SAMIRAN
2,556,221
CONTINUOUS FLOW SINGLE POINT FUEL SERVICING
SYSTEM FOR AIRCRAFT
Filed June 2, 1948
5 Sheets-Sheet 3
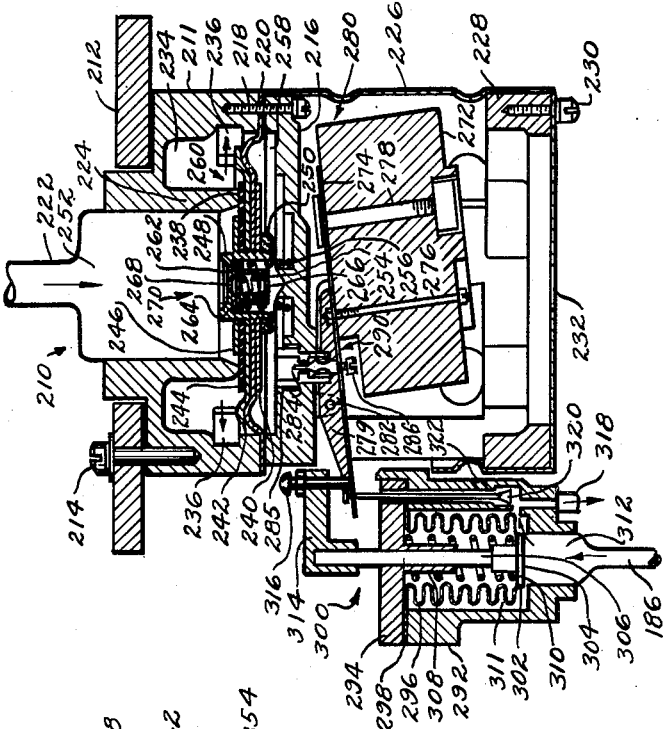
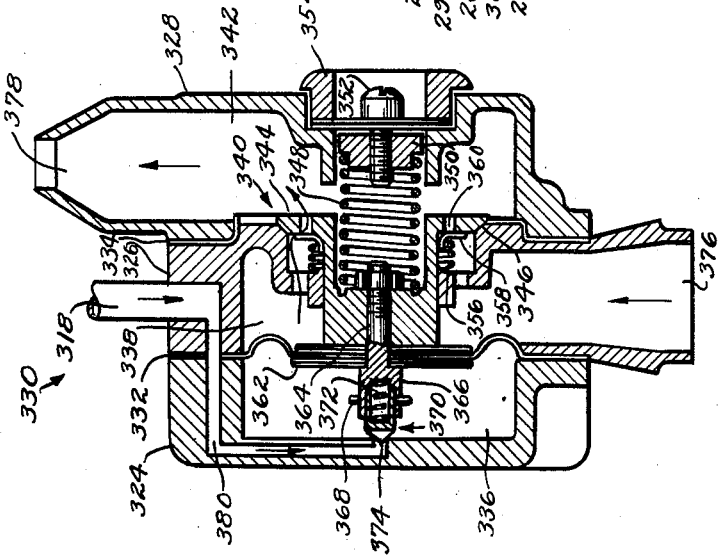
INVENTOR.
DAVID SAMIRAN
BY
ATTORNEYS

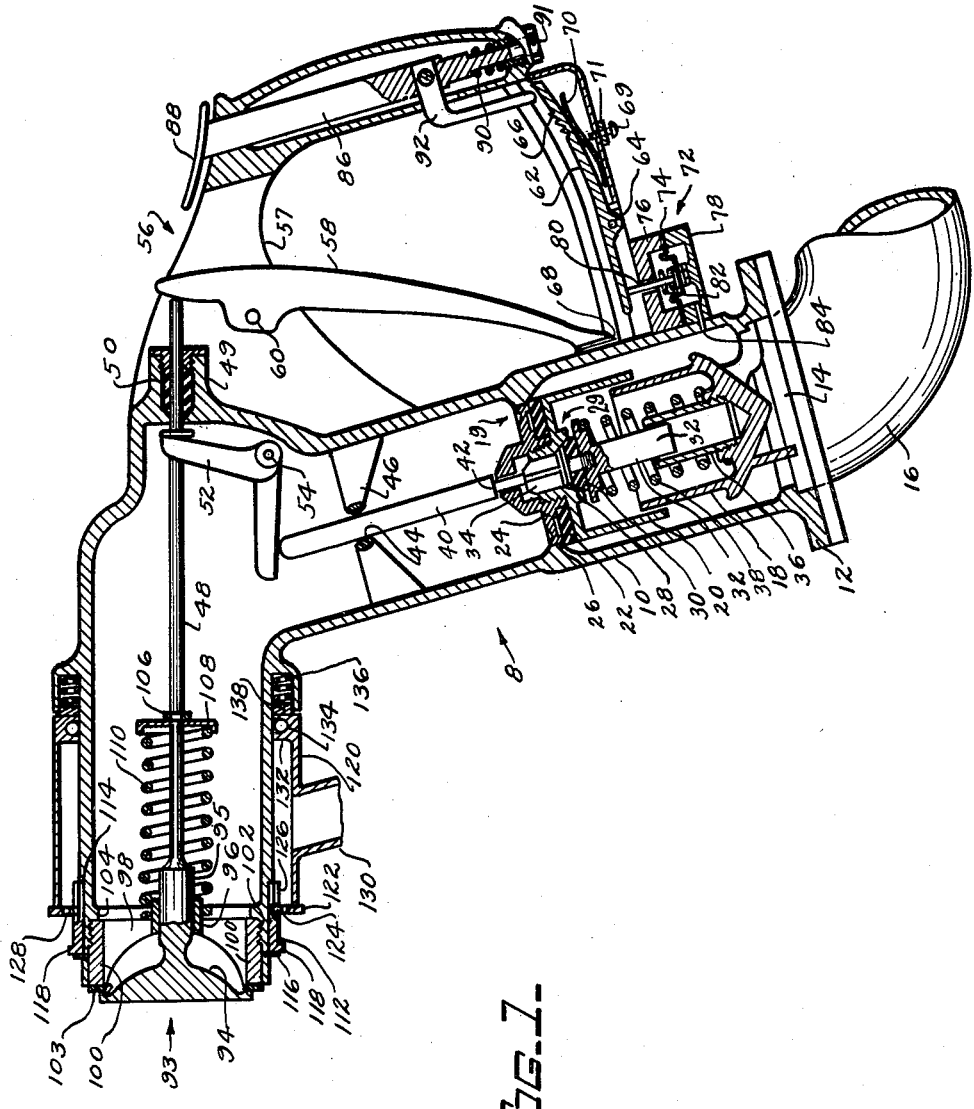

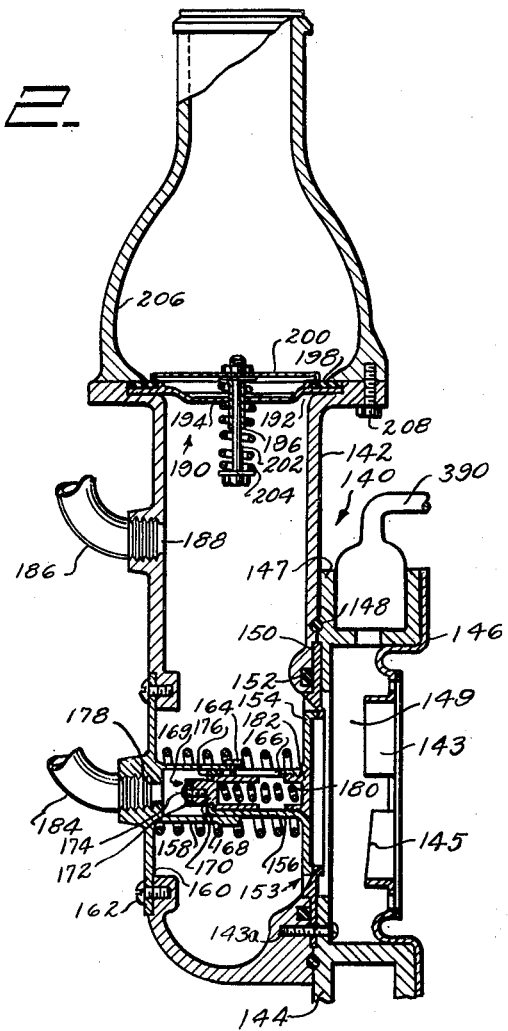

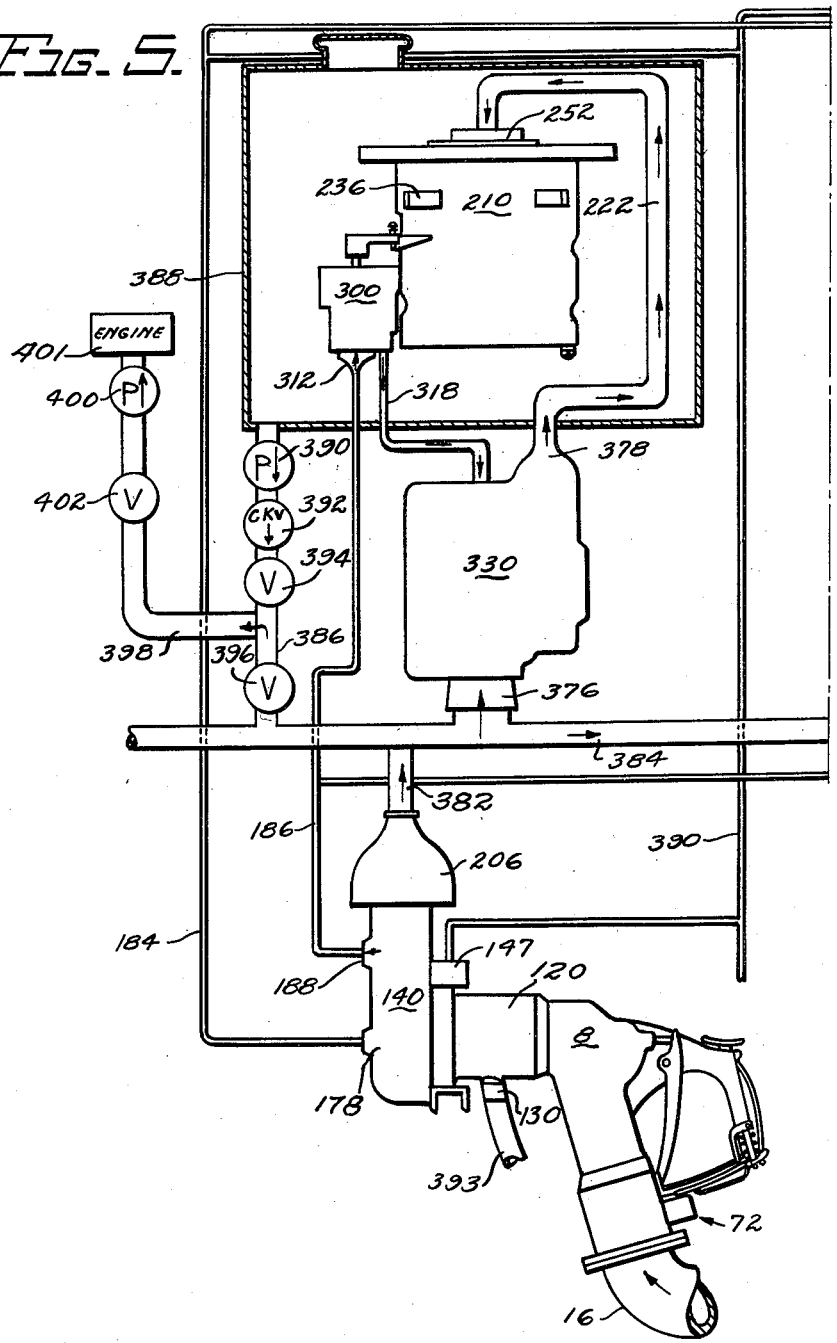

Patented June 12, 1951

2,556,221

UNITED STATES PATENT OFFICE 2,556,221

CONTINUOUS FLOW SINGLE POINT FUEL SERVICING SYSTEM FOR AIRCRAFT

David Samiran, Dayton, Ohio

Application June 2, 1948, Serial No. 30,713

2 Claims. (Cl. 137—68)

The invention described herein may be manufactured and used by or for the Government for governmental purposes without payment to me of any royalty thereon.

This invention relates to a fuel servicing system whereby all of the tanks of an aircraft may be refueled coincidentally and through a single supply nozzle.

An object of the invention is to provide and permanently attach to the aircraft, a single fuel intake fitting through which fuel may pass to a manifold and thence to all of the tanks of the aircraft, the arrangement being such that a plurality of power-plants may all take their fuel from the same manifold.

Another object is to provide the single fuel intake fitting with quick attaching means whereby a single servicing nozzle, carried on the supply hose of a refueling truck may be quickly attached to or detached from the fuel intake fitting.

Inasmuch as the tanks of an aircraft vary considerably in capacity and level, automatic means are provided in each tank for closing it against further fuel entry when a predetermined fuel level is reached.

The servicing system herein shown also includes means whereby, when all tanks of an aircraft have been filled to capacity, the nozzle itself automatically closes against further fuel flow from the servicing truck into the tanks of the aircraft.

Means are also provided whereby, when the nozzle has automatically closed against further fuel inflow, and is then detached from the fuel intake fitting on the aircraft, the act of detaching the nozzle will seal the discharge opening of the nozzle and the intake opening of the fuel intake fitting on the aircraft so that any fuel still in the nozzle will remain therein pending subsequent refueling operations and any fuel still in the fuel intake fitting will be connected to a tank vent and therefore to atmosphere.

In a fuel system of the kind to which the servicing equipment herein shown is applicable, it is important that any portion of the system not filled with liquid fuel be continuously evacuated of dangerous vapors during the entire time that servicing is being effected, and vapor evacuating means are accordingly provided for this purpose, the arrangement of the vapor evacuating means being such that the quick acting means provided for attachment of the nozzle serves as a quick attaching means for connecting the vents of the aircraft tanks to the vent of the servicing truck tank whereby the vapors may be drawn from the aircraft tanks and returned to the truck tank.

Other objects and meritorious features will become evident as the invention is further described and illustrated by means of the drawings, wherein:

Fig. 1 shows, to an enlarged scale and in axial cross section, the nozzle which is carried on the hose of the refueling truck and is adapted for quick connection to the fuel intake fitting.

Fig. 2 is a central cross section through the fuel intake fitting through which all of the tanks on the aircraft are simultaneously filled.

Fig. 3 is an axial section through the automatic shut-off float valve, one of which is provided for each tank on the aircraft, means being provided on each float valve to close against further fuel entry when its tank is filled to capacity, means being also provided to keep the float valve locked in the closed position when it it is once closed until subsequent refueling operations are initiated.

Fig. 4 shows a cross section through a safety device which is also unlocked, upon initiation of the refueling operation, to pass fuel from the fuel intake fitting through a float valve to its tank.

Fig. 5 and Fig. 5a are together a diagrammatic representation of fuel servicing equipment embodying my invention.

Like reference characters refer to like parts throughout the several views.

Figure 5A:
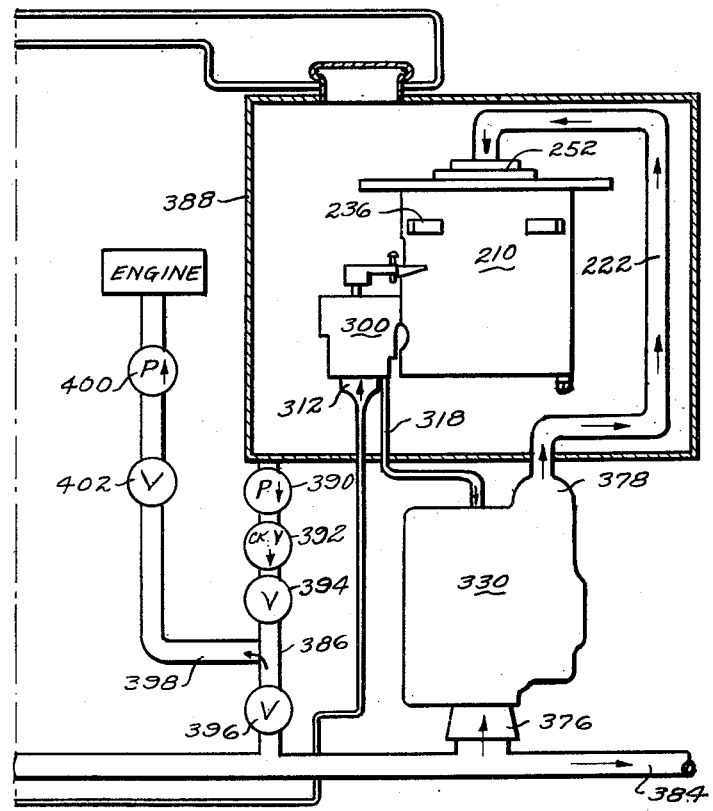

The pistol-grip nozzle, Fig. 1, employed in the present servicing system is, in appearance, much like the one shown in my copending application Serial No. 546,728, filed July 26, 1944, now abandoned, entitled "Multiple Fuel Tank Servicing System for Aircraft." The two nozzles, however, differ considerably in structure and function as will hereinafter appear.

In the drawing, the pistol-grip nozzle 8 has a housing 10 with a flange 12 by which its inflow opening 14 may be permanently connected to the hose 16 which extends from a refueling truck. A triple-legged valve-guide 18 is concentrically supported in the opening 14, a valve head 20 being freely slidable thereover.

A valve 19 comprises a head 20 which carries a resilient disc 22 of synthetic rubber or the like held in place by the retaining nut 24, and adapted to rest on a seat 26 in the housing 10 of the nozzle 8. A smaller valve 29 has its seat 28 in the valve head 20 and is provided with a resilient disc 30 held between an upper and a lower guide member 32 and 34 respectively, the upper guide member being freely slidable in a tube 36 threadedly attached to the valve guide 18 and the lower guide member being freely slidable in the hub of the valve head 20. A spring 38 reacting against the valve guide 18 urges the valve disc 30 onto its seat 28 which in turn urges the valve disc 22 onto its seat 26, thereby closing both valves. A push-rod 40 for opening the valves has a shoulder 42 slightly spaced apart from the retaining nut 24 and is guided in a ring 44 supported on arms 46 extending inwardly in the housing 10 of the nozzle 8. Because of the space under the shoulder 42, the small valve disc 30 will be raised slightly from its seat 28 before the valve disc 22 is raised off its seat 26, thereby decreasing the effort required to raise the larger valve disc 22.

A relatively long valve rod 48 has sliding bearing in a hub 49 in the outer wall of the housing 10, a packing 50 being provided to prevent leakage at this point. A bell crank 52, pivoted in the housing 10 at 54 is operative to transmit endwise movement from the longer rod 48 to the shorter rod 40.

A handgrip mechanism 56 having a framework 57 integral with or attached to the housing 10 is provided to facilitate attachment of the nozzle. A trigger 58 is hinged on the handgrip 56 at 60 whereby raising of the long arm of the trigger operates the long rod 48, which in turn, by way of the bell crank 52, operates the shorter rod 40. A ratchet-like lever 62 is hinged on the handgrip 56 at 64, this lever having ratchet teeth 66 which a pawl 68, on the end of the trigger 58, may engage. A flat spring 70 urges the teeth 66 into engagement with the pawl 68 when the long arm of the trigger 58 is drawn outward. An adjusting screw 69 with lock nut 71 limits movement of the lever 62.

A trigger release mechanism 72 consists of a diaphragm 74 in a two-part casing 76—78, the diaphragm having an operating rod 80 centrally positioned in, and secured to, the diaphragm. A spring 82 biases the diaphragm to the unoperated position. A small hole 84 is provided for admitting a fluid under pressure to the outer surface of the diaphragm whereby movement of the rod 80, acting through the ratchet lever 62, releases the ratchet teeth 66 from the pawl 68 and thereby allows the valve discs 22 and 30 to seat.

Means is also associated with the trigger release mechanism for tripping the release mechanism manually. It consists of a trip bar 86 having bearing at each end in the framework 57 for sliding movement endwise with the bar, with a thumbpiece 88 at the upper end of the bar and a spring 90 at the lower end biasing the bar toward the thumbpiece. A nut 91 limits movement of the bar 86 in the direction of the thumbpiece. A bracket 92 is secured to the bar 86 in such position that it just touches the outer end of the lever 62 when the ratchet notches 66 are in position for engagement with the pawl 68, whereby, if the thumbpiece 88 is depressed when the pawl 68 and ratchet teeth 66 are engaged, the teeth will be withdrawn from the pawl and the valve discs 22 and 30 will seat.

Carried on the forward end of the long valve rod 48 is a valve 93 having a head 94. An enlarged portion 95 of the rod 48 is slidably supported in a bearing 96 held by ribs 98 which extend radially inward from a valve seat collar 100 which is threaded at the upper end as at 102 into the lower end of the nozzle housing 10, and faced with a suitable seat material at the lower end as at 103, an annular rib 104 in the nozzle housing being provided as an abutment for the valve seat collar 100.

A split collar 106 fixed in a groove in the rod 48 holds a flanged disc 108 against which the spring 110 may act to move the rod 48 rightward, the other end of the spring resting on the ribs 98, whereby the valve head 94 is always urged to the closed position shown.

A rotatable sleeve 112 is slidable over the outflow end of the nozzle housing 10 to the shoulder 114 and, in operation, is kept in position by a spring snap ring 116. The lower end of the sleeve 114 has oppositely extending ears 118 which, upon rotation of the sleeve 112, lock in back of appropriately formed ledges in the fuel intake fitting in the aircraft when refueling is about to be effected.

A jacket 120 surrounds the nozzle housing 10. The outer end of the jacket 120 has a flange 122, the inner diameter of the flange being provided with lugs 124 which extend radially inward into keyways 126 formed in the sleeve 112, whereby rotation of the jacket 120 coincidentally rotates the sleeve 112 when the nozzle 8 is being locked into the fuel intake fitting in the aircraft. Holes 128 are provided so that air or vapor may pass through these holes and into the jacket and out through the hub 130. The hub 130 may be used as a lever for rotating the jacket 120.

The inner end of the jacket 120 has an inturned flange 132 internally grooved for the seal ring 134. Pockets are provided in the nozzle housing 10 for springs 136 and slugs 138 whereby the jacket 120 is given limited axial movement in addition to permissible rotative movement with respect to the nozzle body 10. With this arrangement, the flange 122 of the jacket 120 is always maintained in resilient contact with a gasket carried by the fuel intake fitting on the aircraft.

The fuel intake fitting 140 is carried inside the aircraft and comprises a body 142 and mounting bracket 144, the mounting bracket 144 being secured to the skin 146 of the aircraft preferably in the side of the fuselage, the skin 146 preferably being formed inward to provide an opening 143 into which the nozzle 8 may be inserted, the opening being provided with camming surfaces 145 around its edge under which the ears 118 of the nozzle 8 may be turned when securing the nozzle in servicing position. A hub 147 is provided for connecting the space 149 by suitable piping to the tops of the tanks which are to be filled.

The body 142 and mounting bracket 144 are joined together by screws 143a or similar fastening means, a seal 148 being interposed to prevent leakage therebetween. Body 142 and mounting bracket 144 are both recessed for the valve seat disc 150. A seal 152 is provided to prevent leakage between body 142 and disc 150.

A valve 153 has a head 154 and a hollow stem 156 which is slidable in a hub 158 extending from a closure plate 160 which is held to body 142 by screws 162. A screw 164 threaded into the hub 158 extends into a slot 166 in the hollow stem 156. A relatively heavy spring 168 reacts against the closure plate 160 and valve head 154 to move the valve head onto its seat on the disc 150.

A relatively small valve 169 comprises a valve guide 170 which is slidable in the hollow stem 156. Valve guide 170 is faced with a resilient washer 172 held on by screw 174 and is shouldered at 176 whereby the valve member 170 will not seat the washer 172 onto the valve seat 178 to close the small valve 169 except when the larger valve 153 is opened by insertion of the nose of the nozzle 8 in the opening provided for it in the fuel intake device 140. A spring 180 is carried in the hollow interior of the member 170 urging the valve 169 toward closed position, a threaded plug 182 being provided to take the reaction of the spring 180. Conduits 184 and 186 are provided for valve seat opening 178 and a second opening 188 the purpose of which will later appear.

A check valve 190 comprises a valve seat ring 192 having two inwardly extending legs 194 supporting a valve stem guide hub 196. Ring 192 is faced with a washer 198 of resilient material upon which the valve head 200 rests. A valve stem 202 is slidable in the hub 196, and a spring 204 urges the valve to the closed position. A large pipe fitting 206 is held to the body 142 by screws 208, the ring 194 and washer 198 being clamped between the body 142 and fitting 206.

The automatic shut-off valve shown in Fig. 3, one of which is provided for each tank in a fuel system, is similar to the shut-off valve shown in my copending application Serial No. 645,694, filed February 5, 1946 now Patent Number 2,491,521, issued December 20, 1949, except for certain improvements which will hereinafter be explained.

The automatic shut-off float valve, Fig. 3, which may be broadly designated by the numeral 210, comprises an upper housing part 211 with a mounting flange 212 fastened on its top side by screws 214 and a plate 216 secured pressure tight to its underside by means of screws 218, a diaphragm 220 being interposed between housing part 211 and plate 216.

A fuel inlet connection 222 is fitted into a hub 224 which is centrally disposed in the housing part 211. A cup-shaped casing 226 is fastened to a ring 228 by screws 230, the upper end of the casing 226 being made to slip over the plate 216 to which it may be fastened in any suitable manner. A drainage opening 232 is provided in the bottom of the casing 226.

An annular space 234 surrounds the hub 224, and a series of radially extending windows 236 connect the annular space 234 to the outside of the housing. A main valve seat 238 is formed on the lower edge of the hub 224.

The diaphragm 220 is held between washers 240 and 242 while a main valve seat washer 244 is held between washer 242 and a flange 246. Flange 246 is carried in an externally threaded hollow hub 248 and a nut 250 on the lower end of this hub clamps parts 240, 220, 242, 244 and 246 together. The inlet passageway 252 is separated from the annular space 234 whenever the main valve seat washer 244 is on its seat 238.

Within the hollow hub 248 is a flanged cup 254, the upper end of the cup being flanged outwardly and the lower end inwardly, and surrounding this flanged cup is a spring 256, the lower end of which rests on the plate 216 and the upper end of which bears on the underside of the upper flange of the cup. The spring 256 is under sufficient stress to press the main valve seat washer 244 lightly against the seat 238 when the valve is not operating. In operation, however, the main valve seat washer 244 seats only when the pressure in the inlet passageway 252 above the main valve, and the pressure in the chamber 258 below the main valve are equalized. In that case the pressure, acting over a much greater area in the chamber 258 than in the inlet passageway 252, is sufficient to hold the main valve seat washer 244 on its seat 238. The main valve assembly may be broadly designated by the numeral 260.

Formed within the hollow hub 248 is a check valve seat 262 against which a check valve seat washer 264 is held by a spring 266. An inturned flange in the bottom of the cup 254 takes the reaction of the lower end of the spring 266. A small port 268 in the closed upper end of the hollow hub 248 connects the inlet passageway 252 above the main seat washer 244 to the chamber 258 below it, when the check valve seat washer 264 is off its seat 262. The check valve seat washer 264 has an external diameter which is enough smaller than the inside diameter of the cup 254 that the difference in area of the outside of the washer and the inside of the cup about equals the area of the small port 268. The small check valve assembly may be broadly designated by the numeral 270.

A float assembly 280 includes a float member 272 of cork or similar material. A metal plate 274 extends across the top of the cork member 272 and is fastened thereto by bolts 276 and 278. The metal plate 274 is reinforced by a rib 279. The rib 279 is hinged at 282 to the plate 216.

A relatively small bleed valve which may be broadly designated by the numeral 290 may consist of a valve head 284 vertically movable in a valve body 285, the valve body being fixed in the plate 216 and so positioned that when the float 272 rises above the level position as, for instance, to the position shown in Fig. 3, an adjusting screw 286 threadedly held in the plate 274 will lift the valve to a closed position as shown, whereupon fluid under pressure entering the chamber 258 by way of the small check valve 270 will build up in the chamber 258 and close the main valve 260.

For reasons which will hereinafter appear it is desirable when the float 280 has been raised to the position which has caused the main valve 260 to close, that the float be locked in the closed position until subsequent reservicing of the tanks takes place. To attain this end the locking mechanism 300 is provided.

The locking mechanism 300 consists of a cup-shaped body 292 with a lid 294 fastened to the body by any appropriate means. A bellows 296 is flanged outwardly at the upper end and downwardly at the lower end, the outwardly extending flange 298 being clamped pressure tight between the body 292 and lid 294 while the downwardly extending flange 302 is attached pressure tight, to the head 304 of a rod 306 which is slidable vertically in a hub 308 of the lid 294.

A spring 310 inside the bellows 296 tends to stretch the bellows vertically while fluid pressure entering the space 311 around the bellows 296 within the body 292 through the inlet passageway 312 tends to shorten the bellows vertically. An arm 314 extending laterally from the upper end of the rod 306 carries an adjusting screw 316 at its outer end. The lower end of the adjusting screw 316 bears on the plate 274 of the float assembly 280, whereby when the rod 306 is in the down position shown the float is locked in the up position and the main valve 260 is locked in the closed position as shown.

A small valve 320 has its stem operatively attached to the plate 274 of the float assembly 280 whereby when the float is in the up or locked position the valve 320 is open as shown, and when the float is in the down position the valve 320 is closed. A pipe 318 communicates with the space 311 which space is in communication with the outside of the housing through a small leakage opening 322 when the small valve 320 is in the open position shown.

Supplementing the automatic shut-off float valve 210, Fig. 3, is a fuel control valve 330, Fig. 4, which comprises a housing in three parts 324, 326, and 328. A diaphragm 332 is clamped pressure tight between housing parts 324 and 326. A gasket 334 is clamped pressure tight between housing parts 326 and 328, the diaphragm and gasket thereby separating the housing into three pressure tight chambers 336, 338 and 342.

A valve 340 comprises a head 344 resting on a seat 346 formed in the middle housing part 326. A spring 348 has one end pressing against the bottom of a cup-shaped opening in the head 344 and the other end reacting against a nut 350 which is adjustable to vary the strength of the spring by a screw 352. A cap 354 closes the opening through which the spring is assembled. A relatively light spring 356 holds a plate 358 over holes 360 whereby fluid may be made to flow in a reverse direction through the valve 340 when required.

The central portion of the diaphragm 332 is clamped between washers 362 and to the bottom of valve head 344 by a bolt 364. Bolt 364 has a hollow head 366 within which a needle valve 370 has axial movement which is limited by the pin 368. A small coil spring 372 keeps the needle valve 370 in an extended position whereby the needle valve 370 will reach its seat 374 before the larger valve 340 reaches its seat 346 when the spring 348 moves the valve parts leftward to their closed position.

A fluid inlet opening 376 is formed in the middle housing section 326 and a fluid outlet opening 378 is formed in the right housing part 328. The pipe 318 which extends downwardly from the locking unit 300 (see Fig. 5) enters the middle housing section 326, and a channel 380 conveys the fluid from pipe 318 to the needle valve 370.

Fig. 5 and Fig. 5a are together a diagrammatic representation of the improved fuel servicing system. Two tanks only are shown each with its associated equipment as seen in detail in Figs. 3 and 4 but obviously any number of tanks each with like equipment may be connected to and filled or emptied through the same manifold.

A fuel servicing nozzle 8, Fig. 1, connected to a fuel source by the hose 16, is bayonet locked into a fuel intake fitting 140, Fig. 2. A pipe 382 extends from the large pipe fitting 206 on the upper end of the fuel intake 140 to the manifold 384. A pipe line 386 extends from the manifold 384 to the bottom of the tank 388. A booster pump 390, a check valve 392, a motor shutoff valve 394, and a fuel cock 396 are interposed in the pipe line 386. A branch line 398 taken off the line 386, between the shut-off valve 394 and the fuel cock 396 extends to the engine pump 400 and engine 401, a fuel cock 402 being interposed between the pump 400 and the line 386.

Connected to the manifold 384 is the inflow end 376 of the fuel control valve 330, the outflow end 378 being connected by the pipe 222 to the inlet passageway 252 in the top of the automatic shut-off float valve 210 which discharges through the windows 236 into the tank 388.

The pressure inlet passageway 312 of the locking mechanism 300 is connected by the pipe 186 to the opening 188 in the fuel intake device 140. The pipe 184 connects the outlet 178 of the valve 169 to the tops of the tanks. A vapor return pipe 390 connects the tops of the tank to the hub 147 in the vapor return line. A length of hose 393 connects the hub 130 of the jacket 120 to the top of the supply truck tank whereby the tops of the aircraft tanks and the top of the truck tank are connected for flow of vapor from aircraft tanks back to the truck tanks as the tanks are being filled with liquid fuel.

The operation of the improved fuel servicing system herein shown and described may preferably be substantially as follows:

The nozzle 8, Fig. 1, which is permanently attached to a fuel truck by hose 16, is pushed into the opening 143 in the fuel intake device 140, then the sleeve 129 is rotated about ninety degrees using the hub 130 as a lever whereby it is locked in position by the ears 118, Fig. 1, passing under the camming surfaces 145, Fig. 2. At the same time and with the same movement that fastens the nozzle 8 in place, connection is made by way of the jacket 120 between the hub 147 of the fuel intake fitting 140 and the hub 130 of the nozzle jacket. A length of hose 393 is employed to connect the hub 130 to the top of the supply truck tank, while the pipe 390 connects the hub 147 of the fuel intake fitting 140 to the top of the tank 388, whereby the fuel vapor in the top of the tank 388 will return to the space in the top of the truck tank as liquid fuel is transferred from the truck tank to the aircraft tank 388.

When the nozzle is thus secured in the fuel intake device 140 the handgrip 56 is grasped and the trigger 58 is drawn rightward until the pawl 68 catches in and is held by the teeth 66. The act of drawing the trigger to this position opens valves 19, 29, 93, and 153 and closes the valve 169 simultaneously except that the smaller valve 29 opens slightly ahead of the larger valve 19. The fuel, being under pressure, raises the valve 190 and flows through pipe 382 into the manifold 384, through inlet opening 376 into the middle chamber 338 of the fuel control unit 330, where flow into chamber 342 is momentarily arrested because the valve 340 is held shut by the spring 348.

Coincidentally with the flow of fluid into the control valve 330, it flows out of the opening 188 of the fuel intake 140 upwardly through the pipe 186 into the locking mechanism 300 by way of the opening 312, into the space 311 where it builds up fluid pressure faster than it may escape by way of the leakage opening 322 thus compressing the bellows 296 and thereby raising the arm 314 and unlocking the float 280 whereby the float assumes its down position which opens the small valve 290 which in turn allows the main valve 260 to open for flow through the float valve.

The float 280, in thus moving to its down position, closes the small valve 320 thereby sealing the leakage opening 322 whereupon fluid pressure is transferred to the needle valve 370 by way of the pipe 318, the needle valve 370 being thereby raised from its seat which allows the pressure to build up on the left side of the diaphragm 332 which opens the main fuel control valve 340 of the control unit 330 whereupon flow is permitted from the opening 378 through the pipe 222 into the top of the float valve and thus into the tank 388.

When the tank 388 becomes filled to the desired level, the float 280 will assume its upper position, as shown, which will close the small valve 290, which will build up pressure in the chamber 258 and close the main float valve 260 and open the leakage valve 320 which will allow the spring 310 to extend the bellows 296 thus lowering the locking arm 314 to the locking position shown and at the same time reducing the pressure in the chamber 336 of the control unit 330, whereby the main control unit valve 340 may close.

In the embodiment of the invention herein shown and described, only two tanks are shown. It will be readily understood, however, that in actual use a refueling system according to this invention may include as many as six or eight tanks, in which case each tank must be provided with a float valve unit 210 with float locking mechanism and a fuel control unit 330.

When all of the tanks have been filled to the desired level, whereby all of the floats are locked in the up position, by which the main float valve and the main control valve are closed, pressure build up in the nozzle 8 is substantially instantaneous, and this increased pressure, acting through the small hole 84, operates the diaphragm 82 and trips the trigger 62 which coincidentally allows the valves 19, 29, 93, and 153 to close and the small valve 169 to open, whereby, when the nozzle is disconnected, that portion of the fuel within the fuel intake fitting 140 will be held therein by the closed valve 153 and this fuel will be connected to the top of the tank and thus to atmosphere by way of the now open valve 169 and pipe 184. Also that portion of the fuel which still remains in the nozzle will be held therein by the now closed valve 93 in the end of the nozzle.

After the system is serviced as above disclosed the fuel may be fed to the several engines as follows:

By opening valves 402 and 394 and closing valve 396, connection will be established between a given tank and a given engine with no connection to the manifold, the booster pumps 390 being operated to transfer the fuel from any tank directly to its engine.

With valves 402 and 394 open, the valves 396 may be opened, whereupon all tanks will be connected to all engines and fuel will move through the manifold only if one engine consumes more fuel than another or one pump delivers less fuel than another.

With all valves 394 and 396 open and one only of the valves 402 open, and pumps 390 all operating, the flow from all tanks will be to the one selected engine.

With all valves 402 and 396 open and all but one of the valves 394 closed, the flow from a single tank will be distributed among all of the engines.

The fuel in a leaky tank may be transferred to a good tank by opening valves 394 and 396 on both tanks and operating the pump 390 on the leaky tank. During this operation any selected one or more of the engines may be fed by opening the proper valves 402.

Having described my invention, I claim:

1. In an apparatus for transferring liquid fuel from a supply tank containing fuel under pressure to the tank of an aircraft, the combination of a nozzle, a fuel intake fitting, a fuel control unit and a float-operated unit each having an inflow opening and a discharge opening, said nozzle having its inflow opening in communication with the supply tank, a bayonet lock for placing the discharge opening of the nozzle in communication with the inflow opening of the fuel intake fitting, said fuel intake fitting having its discharge opening in communication with the inflow opening of the fuel control unit, and the fuel control unit having its discharge opening in communication with the inflow opening of the float-operated unit, valve means at the discharge opening of said nozzle, manual means for opening said nozzle valve means, a latch for holding said nozzle valve means open, a normally closed main valve in the inflow opening of said fuel intake fitting, adapted, when said bayonet lock is engaged, to be opened by engagement of said nozzle valve means when said nozzle valve means is opened, a normally closed main valve in said fuel control unit, means for normally biasing said normally closed main valve to the closed position, a pressure actuated means associated with said fuel control unit main valve, adapted, when acted upon by a predetermined pressure, to open said control unit main valve, a main valve at the intake opening of the float-operated unit, a float member carried by said float-operated unit operable from a normal to a raised position, mechanism associated with said float member and float-operated unit main valve to effect the closing of said float-operated unit main valve by movement of said float to the raised position, a locking member operable to engage said float member to hold it in its raised position, a second pressure actuated means associated with said locking member, adapted at a predetermined pressure to move said locking member out of engagement with said float member to allow said float member to move to its normal position, a conduit connecting said second pressure actuated means to said fuel intake fitting, a second conduit connecting the second pressure actuated means to the first said pressure actuated means, a bleed valve associated with said float member and operable thereby to bleed off fuel under pressure from said second pressure actuated means back into the tank when said float is in the raised position and operable to divert said fuel under pressure flowing from said second pressure activated means to flow through the said second conduit to operate the first said pressure actuated means to open said fuel control unit main valve, and a third pressure actuated means associated with said nozzle operable by pressure built up in said nozzle upon closing of said float-operated unit main valve to trip said latch to close said nozzle valve.

2. The apparatus defined in claim 1 with means containing a passageway associated with said bayonet lock effective upon operation of said bayonet lock in securing said nozzle in position to place the space above the fuel in the aircraft tank in communication with the space above the fuel in the supply tank.

DAVID SAMIRAN.

REFERENCES CITED

The following references are of record in the file of this patent:

UNITED STATES PATENTS

| Number | Name | Date |
|---|---|---|
| 269,886 | Semple | Jan. 2, 1883 |
| 925,538 | Weaver | June 22, 1909 |
| 1,022,327 | Nelson | Apr. 2, 1912 |
| 1,263,570 | Chapelle | Apr. 23, 1918 |
| 1,333,646 | Watrous | Mar. 16, 1920 |
| 1,370,532 | Fulton | Mar. 8, 1921 |
| 1,725,826 | Payne | Aug. 27, 1929 |
| 1,776,877 | Yonkese | Sept. 30, 1930 |

(Other references on following page)

UNITED STATES PATENTS

| Number | Name | Date |
|---|---|---|
| 1,806,833 | Ullendorff | May 26, 1931 |
| 2,120,770 | Stern | June 14, 1938 |
| 2,211,237 | Langdon | Aug. 13, 1940 |
| 2,234,393 | Amiot | Mar. 11, 1941 |
| 2,247,509 | Lebus | July 1, 1941 |
| 2,266,682 | Amiot | Dec. 16, 1941 |
| 2,304,906 | Gibbs | Dec. 15, 1942 |
| 2,334,220 | Samiran | Nov. 16, 1943 |
| 2,343,903 | Hammand | Mar. 14, 1944 |
| 2,345,547 | Roth | Mar. 28, 1944 |
| 2,356,786 | Harman et al. | Aug. 29, 1944 |
| 2,384,628 | Krone | Sept. 11, 1945 |
| 2,458,245 | Bordelon | Jan. 4, 1949 |
| 2,464,456 | McGillis | Mar. 15, 1949 |
| 2,477,186 | Koehler | July 26, 1949 |
| 2,491,521 | Samiran | Dec. 20, 1949 |

FOREIGN PATENTS

| Number | Country | Date |
|---|---|---|
| 492,016 | Germany | of 1930 |